Sept. 13, 1966     L. G. GRUBER ETAL     3,271,866

POSITION LOCATOR FOR AIRPLANES AND THE LIKE

Filed Jan. 3, 1962

INVENTORS.
LYNTON L. SCHARFF
LESLIE G. GRUBER
BY John R. Walker, III
Attorney

United States Patent Office 3,271,866
Patented Sept. 13, 1966

3,271,866
POSITION LOCATOR FOR AIRPLANES
AND THE LIKE
Leslie G. Gruber, 4530 Shady Grove Road, Memphis, Tenn., and Lynton L. Scharff, 3001 Ozark Ave., Little Rock, Ark.
Filed Jan. 3, 1962, Ser. No. 163,982
5 Claims. (Cl. 33—75)

This invention relates to a position locator for locating the position of an airplane, boat or the like on a chart or map.

In the following description reference will be made to the use of the locator for the navigation of airplanes, but it will be understood that the present invention is adapted for use in navigating boats and the like.

There presently exist various navigational aids for pilots of planes. For example, there is the well-known automatic direction finder or ADF system, which employs a low frequency radio receiver located in the airplane that indicates the relative bearing to any station from which a signal is being received. Such stations usually are the FAA range stations and commercial broadcast stations indicated on the chart. In order to convert the relative bearing into a true reciprocal bearing so that a line of position can be plotted on the chart, a number of time consuming calculations must be made. This is a burdensome procedure and with the fast planes of today, by the time two stations are tuned in successively; both reciprocal bearings are computed; and the two position lines plotted to give a resection or fix, the plane is usually several miles away from the fix. Also, there is the Omni system (VORTAC or TACAN) which employs high frequency Omni receiving equipment in the airplane so that an Omni radial can be flown to a station or a radial can be flown from a station. Thus, the pilot knows when he is located on a certain radial, but in order to find his exact location on this radial he must tune to another Omni or ADF station and make a resection. If an ADF station is used, the calculations mentioned above must be made before the resection or fix can be plotted.

The present invention is directed towards overcoming the above mentioned disadvantages in previous navigational aids by providing a position locator which utilizes existing navigational charts and navigational equipment in the airplane, but which eliminates completely the need for calculations in locating the position of the airplane.

Thus, one of the objects of the present invention is to provide a position locator which can be quickly manipulated to determine the location of an airplane, boat or the like.

A further object is to provide such a locator which is extremely accurate and highly efficient in locating the position of an airplane, boat or the like.

A further object is to provide such a locator which is simple in construction and easy to operate.

A further object is to provide such a locator requiring only two mechanical steps and requiring no exercise of judgment, thereby eliminating chances of error due to faulty judgment.

A further object is to provide such a locator which can be used with existing Omni and/or ADF equipment in an airplane or boat to determine the location thereof in a much shorter time than heretofore possible.

The means by which the foregoing and other objects of the present invention are accomplished and the manner of their accomplishment will be readily understood from the following specification upon reference to the accompanying drawings, in which.

Figure 1:
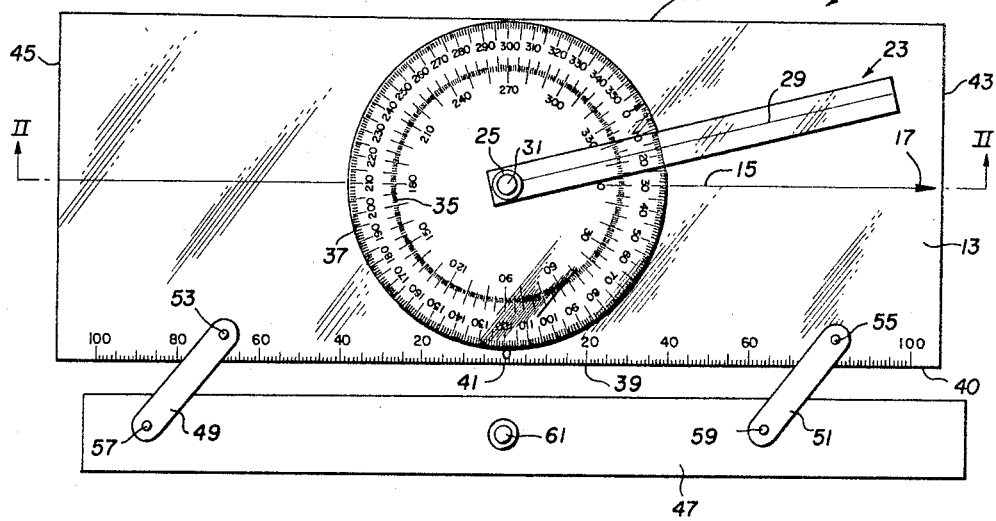
FIG. 1 is a plan view of the locator of the present invention.
Figure 2:
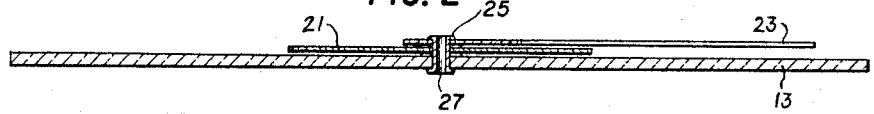
FIG. 2 is a cross sectional view taken as on the line II—II of FIG. 1.
Figure 3:
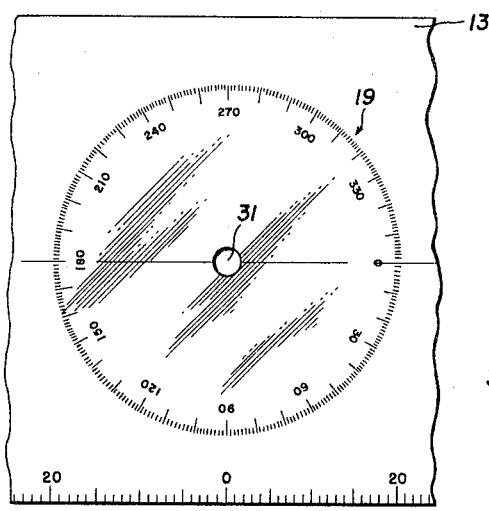
FIG. 3 is an enlarged fragmentary view of the base plate per se.

Referring now to the drawings in which the various parts are indicated by numerals, the locator 11 of the present invention includes a substantially rectangular base plate 13 formed of a suitable rigid transparent material as plastic or the like. A center line 15 provided with an arrow 17 adjacent the zero end thereof is imprinted on base plate 13 and extends longitudinally thereof substantially along the mid-portion thereof.

A clockwise azimuth scale 19 is imprinted on base plate 13 adjacent the middle thereof. Scale 19 is arranged so that the center thereof is in line with center line 15 and the zero mark of the azimuth scale coincides with center line 15.

Centrally mounted on base plate 13 is a transparent rigid disc 21, preferably formed of clear plastic or the like, and an elongated pointer 23, also preferably formed of clear plastic or the like. Disc 21 and pointer 23 are rotatably mounted on base plate 13 as by means of a tubular rivet 25 which extends through aligned apertures in base plate 13, disc 21, and pointer 23 and which permits the disc and pointer to each rotate independently of each other and base plate 13. A vertical bore 27 is defined by rivet 25 and is for a purpose later to be described.

Pointer 23 has imprinted thereon an index line 29 which extends along the length of the pointer and extends radially outward from adjacent an imaginary center 31 that is also the center for disc 21 and azimuth scale 19. Pointer 23 is preferably located on top of disc 21 with the pointer extending radially beyond the disc.

Figure 4:
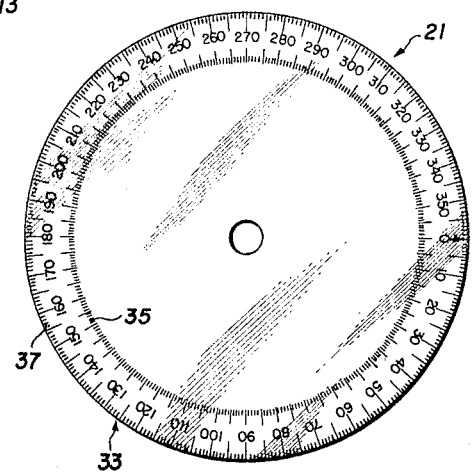
FIG. 4 is an enlarged plan view of the disc per se.
Figure 5:
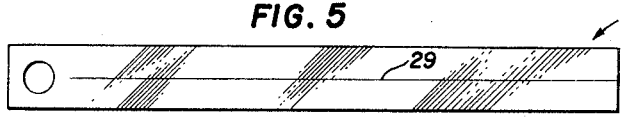
FIG. 5 is an enlarged view of the pointer per se.

Disc 21 is provided with a clockwise azimuth scale 33, which is preferably subdivided into two parts, i.e., an inner scale 35 spaced inwardly from the edge of disc 21 and an outer scale 37 adjacent the outer edge of the disc. Scales 35, 37 are concentric and read clockwise from zero to 360 degrees with the numbering thereof preferably being located between the two scales, as best seen in FIG. 4. The centers of scales 35, 37 are the same as center 31, and inner scale 35 is arranged so as to overlap or be closely adjacent to scale 19.

For ease of reading, the scales are preferably, though not necessarily, of different colors. For example, base scale 19 is preferably yellow, inner scale 35 is preferably red, and outer scale 37 is preferably blue. It will be understood that the above mentioned colors of the scales do not limit the invention to scales having these colors but are given merely for purposes of illustration.

A distance scale 39, which is preferably marked off in statute miles and/or nautical miles to the scale of the chart or map with which it is contemplated to use the locator 11 of the present invention, is provided on base plate 13 adjacent the lower edge 40 thereof. The zero mark 41 of scale 39 is preferably inscribed in line with center 31 so that the numbers increase from the zero mark towards both side edges 43, 45 of base plate 13.

A rectangular ruler 47 is movably attached to base plate 13 adjacent edge 40 for parallel movement relative thereto. This attachment is preferably by a pair of arms 49, 51 which are of the same length and are respectively pivotally attached to base plate 13 and ruler 47. The pivotal attachments of arms 49, 51 to base plate 13 are respectively designated as at 53 and 55, and the pivotal attachments of the arms with ruler 47 are respectively designated as at 57 and 59. A knob 61 is preferably provided on ruler 47.

In general, the locator 11, in the operation thereof, determines the position of an airplane on a chart or map that shows the location of navigational radio facilities by materializing on the chart or map the invisible lines indicated by the radios and the airplane's compass. These lines intersect at center 31 which is the location of the airplane.

More specifically, locator 11 is used by first selecting any desired true compass or magnetic heading. Next, the Omni receiver is tuned to any available station and the ADF receiver is tuned to an available station on the appropriate chart. It should be noted that for best results the ADF station should be more than ten degrees off the heading of the airplane. Then, at any given time, while holding the airplane on the selected true compass heading, the Omni needle should be centered and the scale read. At the same time, the ADF direction indicator or dial should be read. The reading on the Omni scale indicates the Omni radial on which the airplane was at the time of reading, and the reading on the ADF dial indicates the relative bearing from the airplane to the ADF station at the time of reading.

Having obtained the readings in the above mentioned manner, these readings are used as follows: Set the reading of the Omni scale on the inner scale 35 over or opposite the compass heading on the azimuth scale 19 and then rotate pointer 23 until its index line 29 is over the ADF dial reading on the outer scale 37. Next, place the locator 11 on the chart or map over the compass rose of the Omni station tuned to, with the arrow 17 pointing in the direction of the Omni radial indicated so that the center line 15 is over and becomes a prolongation of the Omni radial. Then, move the locator 11 along this radial line until the index line 29 is over the ADF station location on the chart or map. With the locator 11 positioned as above described, center 31 will indicate the position of the airplane at the time of taking the reading. If it is desired to mark the position at that time, a pencil point is merely inserted through bore 27 to mark the position on the chart or map.

To more specifically illustrate the use of locator 11, the following theoretical example is given:

Selected true compass heading—30 degrees
Omni scale reading—TO–40
ADF direction indicator or dial—80

Using the above readings, rotate disc 21 to place 40 of inner scale 35 over or opposite 30 of scale 19 and rotate pointer 23 until index line 29 is over 80 on outer scale 37. Then, place locator 11 on the chart or map over the compass rose of the Omni station previously selected with arrow 17 pointing in the direction of and along the 40 degree radial with the center line 15 over this radial, and slide the locator 11 with center line 15 along the prolongation of the 40 degree radial until the index line 29 is over the ADF station previously selected. The position of the airplane at the time of taking the readings was at a point on the chart at the center 31.

In the above example, since the Omni reading was "TO–40," the locator was placed on the chart with the arrow 17 pointing in the direction of and along the 40 degree radial, that is to say, the northeast. Since, for any position, an Omni radio can indicate a "FROM" reading as well as a "TO" reading, the "FROM" reading is the reciprocal of the "TO" reading and vice versa; and in this case, "FROM–220." If the "FROM–220" reading is used, the 220 of the inner scale 35 should be placed over or opposite the 30 of scale 19 and the relative bearing will remain 80 degrees. Then, locator 11 is placed on the chart over the compass rose previously indicated with the arrow 17 pointing in the direction of and along the 220 degree radial, that is to say, toward the southwest. For any position, with the use of the Omni radio, either "TO" or "FROM" readings can be used, provided locator 11 is placed on the chart over the appropriate compass rose with the arrow 17 pointing in the direction of the Omni radial indicated.

Also, it will be understood from the foregoing example that the distance scale 39 can be used to determine the distance of the airplane from the Omni station. It should be noted that an additional scale, not shown, similar to scale 39 may be provided along the upper edge 63 of base plate 13 so that it can be used with another chart having a different scale.

The above described example of use with the Omni and ADF radio in combination is preferable since the Omni scale and ADF direction indicator can be read simultaneously while the airplane is at a certain point. However, the use of the invention with two Omni stations alone, or with two ADF stations alone, is possible.

To use the locator 11 with two Omni stations, tune to one station selected as a base station; center the Omni needle and read the Omni scale. This will indicate the Omni radial of the first station that the airplane is on. Then, as quickly as possible, tune to the second Omni station; center the Omni needle and read the Omni scale. This will indicate the Omni radial of the second station that the airplane is on. Disc 21 is turned so that the reading of the first or base station on outer scale 37 is over center line 15. Next, the pointer 23 is rotated until index line 29 is over the reading of the second Omni station on outer scale 37. Then, place the locator 11 on the chart or map over the compass rose of base Omni station so that the center line 15 is over and becomes a prolongation of the Omni radial with the arrow 17 along and in the direction of the Omni radial indicated by the reading on the Omni scale on the first or base Omni station. It will be understood that the zero of scale 37 will indicate magnetic north when the locator 11 is so positioned. Then, the locator is moved along this radial line until the index line 29 is over the second Omni station, whereupon the location of the airplane will be at center 31.

In the above example, for the first or base Omni station the Omni reading can be either "TO" or "FROM" since the locator 11 will be properly oriented whenever the locator is placed on the chart so that the arrow 17 is along and in the direction of the first or base Omni station radial. For the second Omni station, "TO" readings are preferable since pointer 23 should be in the direction of the station from the airplane. If "FROM" readings are taken, then the pointer 23 should be set on the reciprocal of the reading taken.

To use the locator 11 with two ADF stations, head the airplane towards one of the stations selected as a base station and note the true compass heading of the airplane. While maintaining this heading, tune to the second station as quickly as possible and note the relative bearing to this station. Set the zero mark of scale 37 over center line 15. Then, by means of any convenient compass rose on the chart and the parallel ruler 47, draw the true heading of the airplane on the chart through the base ADF station (or base low frequency station). Next, set pointer 23 so that index line 29 is over the relative bearing of the second station on scale 37. Then, slide the locator 11 along the line of the true heading with the arrow 17 pointing in the direction of the true heading until the index line 29 is over the second station, whereupon the position of the airplane will be at center 31.

From the foregoing description it will be seen that a very convenient and handy navigational device is provided which utilizes existing navigational equipment in the airplane but which completely eliminates the need for calculations in locating the position thereof.

Although the invention has been described and illustrated with respect to a preferred embodiment thereof, it is to be understood that it is not to be so limited since changes and modifications may be made therein which are within the full intended scope of this invention as hereinafter claimed.

We claim:

1. A position locator for locating the position of an airplane and the like on navigational charts and maps from readings indicated on ADF and/or Omni instruments and by the compass carried by the airplane and the like, said position locator comprising a transparent base plate having a base plate azimuth scale reading from zero degrees to 360 degrees and having a center line extending longitudinally of said base plate in alignment with the zero line of said base plate azimuth scale and having an arrow thereon pointing outwardly from the zero line, a transparent disc having a disc azimuth scale reading from zero degrees to 360 degrees, said disc azimuth scale being subdivided into an inner scale and an outer scale, an elongated transparent pointer having an index line thereon; means having a bore therethrough rotatably mounting said disc and said pointer on top of said base plate for 360 degree rotation of said disc and said pointer, respectively, relative to said base plate with the center of the bore coinciding with the centers of said base plate azimuth scale and said disc azimuth scale, with said index line, if extended, intersecting the center of the bore, and with said inner scale being adjacent said base plate azimuth scale, said disc and said pointer being supported by said base plate with said base plate being adapted to rest on navigational charts and maps whereby said disc and said pointer are rotatable relative to the navigational charts and maps; said base plate having a distance scale thereon with the zero point thereof being opposite the center of said bore and increasing in readings in opposite directions therefrom, a ruler and a pair of arms of equal length pivotally connected adjacent opposite ends thereof respectively to said ruler and said base plate whereby said ruler is adapted to be moved in parallel relationship to said base plate.

2. A position locator for locating the position of an airplane and the like on navigational charts and maps from readings indicated on instruments carried by the airplane and the like, said position locator comprising a transparent base plate having a base plate azimuth scale reading from zero degrees to 360 degrees, and having a center line extending longitudinally of said base plate in alignment with the zero line of said base plate azimuth scale and having an arrow thereon pointing outwardly from the zero line, a transparent disc having a disc azimuth scale reading from zero degrees to 360 degrees, said disc azimuth scale being subdivided into an inner scale and an outer scale, an elongated transparent pointer having an index line thereon; means having a bore therethrough rotatably mounting said disc and said pointer on top of said base plate for 360 degree rotation of said disc and said pointer, respectively, relative to said base plate with the center of the bore coinciding with the centers of said base plate azimuth scale and said disc azimuth scale, with said index line, if extended, intersecting the center of the bore, and with said inner scale being adjacent said base plate azimuth scale, said disc and said pointer being supported by said base plate with said base plate being adapted to rest on navigational charts and maps whereby said disc and said pointer are rotatable relative to the navigational charts and maps; said base plate having a distance scale thereon with the zero point thereof being opposite the center of said bore and increasing in readings in opposite directions therefrom.

3. A position locator for locating the position of an airplane and the like on navigational charts and maps from readings indicated on instruments carried by the airplane and the like, said position locator comprising a transparent base plate having a base plate azimuth scale reading from zero degrees to 360 degrees and having a center line extending longitudinally of said base plate in alignment with the zero line of said base plate azimuth scale and having an arrow thereon pointing outwardly from the zero line, a transparent disc having a disc azimuth scale reading from zero degrees to 360 degrees, said disc azimuth scale being subdivided into an inner scale and an outer scale, an elongated transparent pointer having an index line thereon; means having a bore therethrough rotatably mounting said disc and said pointer on top of said base plate for 360 degree rotation of said disc and said pointer, respectively, relative to said base plate with the center of the bore coinciding with the centers of said base plate azimuth scale and said disc azimuth scale, with said index line, if extended, intersecting the center of the bore, and with said inner scale being adjacent said base plate azimuth scale, said disc and said pointer being supported by said base plate with said base plate being adapted to rest on navigational charts and maps whereby said disc and said pointer are rotatable relative to the navigational charts and maps.

4. A position locator for locating the position of an airplane and the like on navigational charts and maps from readings indicated on instruments carried by the airplane and the like, said position locator comprising a transparent base plate having a base plate azimuth scale reading from zero degrees to 360 degrees and having a center line extending longitudinally of said base plate in alignment with the zero line of said base plate azimuth scale and having an arrow thereon pointing outwardly from the zero line, a transparent disc having a disc azimuth scale reading from zero degrees to 360 degrees, an elongated transparent pointer having an index line thereon; means having a bore therethrough rotatably mounting said disc and said pointer on top of said base plate for 360 degree rotation of said disc and said pointer, respectively, relative to said base plate with the center of the bore coinciding with the centers of said base plate azimuth scale and said disc azimuth scale, with said index line, if extended, intersecting the center of the bore, and with said disc azimuth scale being adjacent said base plate azimuth scale, said disc and said pointer being supported by said base plate with said base plate being adapted to rest on navigational charts and maps whereby said disc and said pointer are rotatable relative to the navigational charts and maps.

5. A position locator for locating the position of an airplane and the like on navigational charts and maps from readings indicated on instruments carried by the airplane and the like, said position locator comprising a base plate having a base plate azimuth scale reading from zero degrees to 360 degrees and having a center line in alignment with the zero line of said base plate azimuth scale, a disc having a disc azimuth scale reading from zero degrees to 360 degrees, an elonglated pointer, means rotatably mounting said disc and said pointer on top of said base plate for 360 degree rotation of said disc and said pointer, respectively, relative to said base plate with said disc azimuth scale and said base plate azimuth scale being adjacent one another and having the same center and with said pointer extending outwardly from said center, said disc and said pointer being supported by said base plate with said base plate being adapted to rest on navigational charts and maps whereby said disc and said pointer are rotatable relative to the navigational charts and maps.

References Cited by the Examiner

UNITED STATES PATENTS

| | | | |
|---|---|---|---|
| 2,007,986 | 7/1935 | Sprague | 33—76 |
| 2,238,190 | 4/1941 | Sawtelle | 33—98 |
| 2,438,730 | 3/1948 | Watter | 33—76 |
| 2,545,935 | 3/1951 | Warner. | |

FOREIGN PATENTS

| | | |
|---|---|---|
| 581,013 | 9/1946 | Great Britain. |
| 69,615 | 1/1928 | Sweden. |

LOUIS R. PRINCE, *Primary Examiner.*

ISAAC LISANN, *Examiner.*

J. D. BOOS, D. McGIEHAN, *Assistant Examiners.*